United States Patent

[11] 3,581,191

[72] Inventor Weston A. Anderson
Palo Alto, Calif.
[21] Appl. No. 847,859
[22] Filed Aug. 6, 1969
[45] Patented May 25, 1971
[73] Assignee Varian Associates
Palo Alto, Calif.

[54] PHASE CORRELATION FOR AN RF SPECTROMETER EMPLOYING AN RF CARRIER MODULATED BY A PSEUDORANDOM SEQUENCE
11 Claims, 7 Drawing Figs.

[52] U.S. Cl. ................................. 324/0.5,
235/151.35
[51] Int. Cl. ....................................... G01n 27/78
[50] Field of Search .......................... 324/0.5
Lit., 58, 58.5; 235/151.35; 250/41.9 DS; 331/78

[56] References Cited
UNITED STATES PATENTS
3,461,381 8/1969 Nelson .......................... 324/0.5
3,475,680 10/1969 Anderson ...................... 324/0.5
OTHER REFERENCES
" Nuclear Magnetic Double Resonance With An Incoherent Radio Frequency Field" , R. R. Ernst, " The Journal of Chemical Physics" , 45(10), Nov. 15, 1966, pp. 3845— 3861.

*Primary Examiner*—Michael J. Lynch
*Attorneys*—Stanley Z. Cole and Leon F. Herbert

ABSTRACT: The radio frequency spectrometer is disclosed employing a radio frequency transmitter which transmits a wide band of energy to the sample for simultaneously exciting radio frequency resonance of different spectral lines of the sample. The wide band transmitter energy is generated by a radio frequency carrier which is modulated by a pseudorandom binary sequence to produce the wide bandwidth for exciting the sample. The pseudorandom binary sequence is repetitive and the excited composite resonance signal is repetitively time scanned and sampled at a multiplicity of intervals during each scan. The sampled data derived from repetitive scans are digitized and sequentially stored and added in their respective channels of a storage unit to produce a time average for improving the signal noise ration. The pseudorandom binary sequence is synchronized with the time scan of the composite resonance signal to preserve the phase relation between successively sampled and stored data from successive scans, whereby either pure absorption or pure dispersion mode resonance data is obtained.

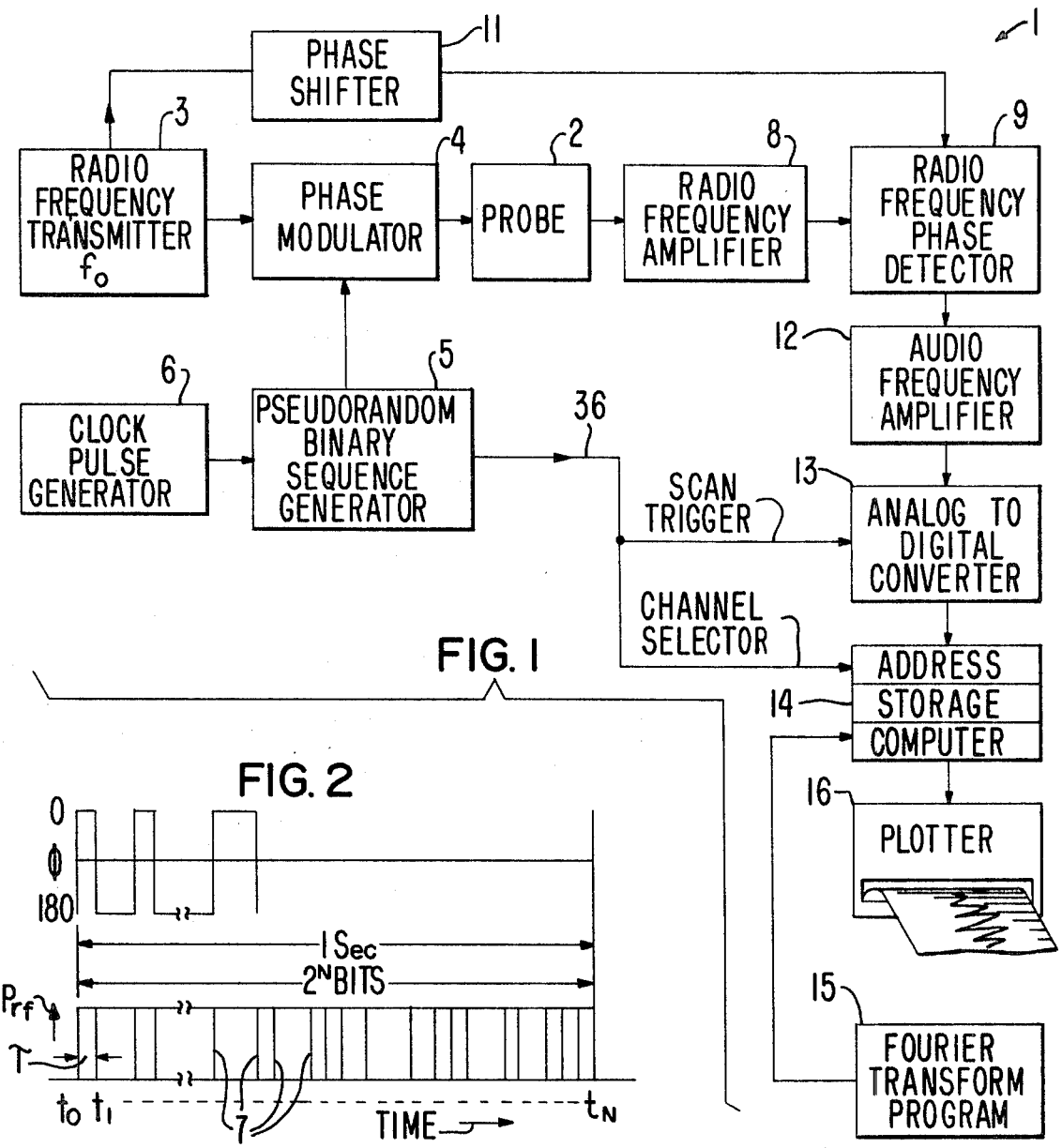
FIG. 1
FIG. 2
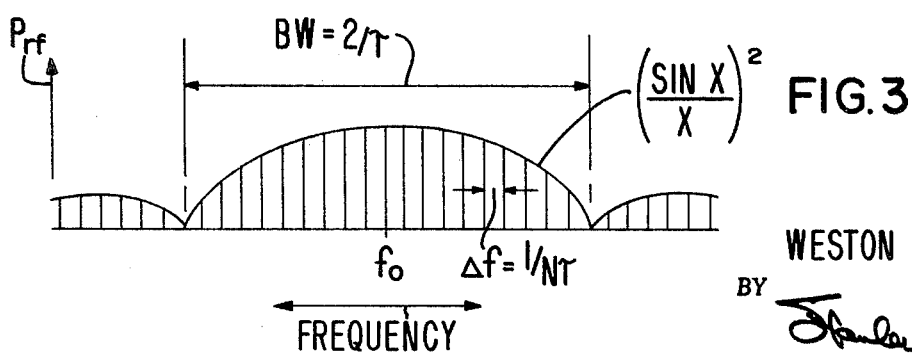
FIG. 3
INVENTOR.
WESTON A. ANDERSON

INVENTOR.
WESTON A. ANDERSON

PHASE CORRELATION FOR AN RF SPECTROMETER EMPLOYING AN RF CARRIER MODULATED BY A PSEUDORANDOM SEQUENCE

DESCRIPTION OF THE PRIOR ART

Heretofore, radio frequency spectrometers have employed a pulsed radio frequency transmitter, the pulses being very short and of a relatively low repetition rate as of one per second to produce a sufficiently wide band of relatively closely spaced Fourier components to simultaneously excite a plurality of resonance lines of the sample under analysis. For example, radio frequency nuclear resonance spectrometers have employed a radio frequency carrier signal at, for example, 100 megahertz which is pulsed with relatively short bursts of the radio frequency energy as of 300 microseconds duration at a repetition rate of one pulse per second. This produces substantial energy in the sidebands of the carrier having a bandwidth of approximately 1 kilohertz with frequency separation of the Fourier components of the sidebands of approximately one cycle. Such a spectrometer is disclosed and claimed in copending U.S. application 459,006, filed May 26, 1965, now U.S. Pat. No. 3,475,680 and assigned to the same assignee as the present invention. In this prior spectrometer each pulse of the transmitter excites simultaneous resonance of the various proton spectral lines of the nuclear resonance sample under analysis. The resonance signals emanating from the sample form a transient composite resonance signal which is sampled in the period between successive transmitter pulses at a multitude of time displaced increments having a time spacing of approximately 1 millisecond. The sampled intensity of the resonance signal at each sampled point is converted into digital data which data is stored in successive channels of a time-averaging computer. The sampled resonance data obtained for a multitude of successive time scans of successive transient resonance signals provides a substantial enhancement in signal to noise ratio since the signal information is coherent and adds in the respective channels according to the number of added scans, whereas the noise information is incoherent and tends to add only as the square root of the number scans. The sampling times were synchronized by a signal derived from the transmitter pulses to preserve the relative phase relations of successive resonance signal components stored in the same channel. The composite resonance signal information stored in the respective channels is converted from the time domain to the frequency domain by means of a Fourier transform operation performed by a computer. The data stored and added in the respective channels is read out in the more conventional frequency domain via the Fourier transformation to obtain a time averaged resonance spectrum of the sample under analysis.

The problem with this prior spectrometer is that the peak power of the transmitter pulse is a function of the required bandwidth of the excitation required to excite all the various spectral lines of the sample under analysis. When the required bandwidth is only on the order of about 1 kilohertz the peak power for the transmitter pulse can be relatively low as on the order of fractions of a watt. However, when an attempt is made to extend the scheme to an analysis of fluorine compounds by observing the nuclear resonance of fluorine, the required bandwidth increased from 1 kilohertz to 40 kilohertz and the peak power required for the transmitted pulses become hundreds of watts as opposed to a fraction of a watt. It becomes difficult and expensive to generate such relatively high peak powers at the higher radio frequencies required for fluorine, as of 94 megahertz. Therefore, it is desirable to provide a spectrometer which can simultaneously excite all the various resonance lines of the sample under analysis by an arrangement which utilizes substantially less peak power.

It is also known from the prior art that a relatively broad band spectrum of a sample can be simultaneously excited into resonance with substantially lower peak powers by modulating the transmitter carrier signal with a pseudorandom sequence of binary data to produce a relatively wide band of transmitted noise power. This has been employed in a gyromagnetic resonance spectrometer to excite the resonance of a plurality of lines of a sample for spin decoupling the various resonance lines from a given resonance line to be analyzed. Such a spectrometer is disclosed and claimed in copending U.S. Application 568,041 filed July 26, 1966, now abandoned, and assigned to the same assignee as the present invention. However, in this latter spectrometer there was no provision for observing the plurality of resonance lines which were simultaneously excited, nor was there any teaching nor suggestion of means for preserving or correlating the phase relations of the simultaneously excited resonance lines, since all that was required was that they be excited into resonance to decouple their spin systems from the spin system under analysis. A separate transmitter signal was employed for exciting resonance of the certain resonance line to be analyzed.

SUMMARY OF THE PRESENT INVENTION

The principal object of the present invention is the provision of an improved radio frequency spectrometer.

One feature of the present invention is the provision, in a radio frequency spectrometer, of a radio frequency transmitter generating a radio frequency carrier which is modulated with a pseudorandom binary sequence to produce a relatively wide band of closely spaced sidebands having sufficient bandwidth to cover a relatively wide band of spectral lines to be analyzed and including means for synchronizing the repetitive pseudorandom binary sequences with the repetitive time displaced sampling times for successive time scans of the resultant composite resonance signals, whereby phase correlation is preserved for the various resonance components for a sequence of composite resonance signals.

Another feature of the present invention is the same as the preceding feature wherein the sampling times for each pseudorandom binary sequence are synchronized with each of the binary outputs in the pseudorandom binary sequence, whereby the phase information for each of the components of the resonance signal is preserved in successive cycles of the pseudorandom sequence.

Another feature of the present invention is the same as any one or more of the preceding features wherein the phase of the transmitted radio frequency carrier signal is modulated according to the pseudorandom binary sequence, whereby the transmitter power remains constant throughout the pseudorandom sequence, thereby substantially reducing the peak power requirements of the transmitter.

Another feature of the present invention is the same as any one or more of the preceding features wherein the pseudorandom binary sequence is generated by means of a shift register having an array of binary elements with the ends of the array of binary elements being interconnected by means of a feedback circuit loop containing at least one modulo-2-adder, such shift register being connected for a maximum length sequence, whereby the complexity of the pseudorandom binary sequence generator is minimized.

Other features and advantages of the present invention will become apparent upon a perusal of the following specification taken in connection with the accompanying drawings, wherein:

BRIEF DESCRIPTION OF THE DRAWINGS

FIG. 1 is a schematic block diagram of a radio frequency spectrometer incorporating features of the present invention, FIG. 2 is a plot of transmitted radio frequency power versus time depicting a pseudorandom modulation sequence wherein the phase of the radio frequency transmitted power is modulated according to a pseudorandom binary sequence, FIG. 3 is a plot of radio frequency power versus frequency depicting the spectrum generated by the radio frequency transmitter modulated in accordance with the pseudorandom binary sequence depicted in FIG. 2.

DESCRIPTION OF THE PREFERRED EMBODIMENTS

Figure 4:
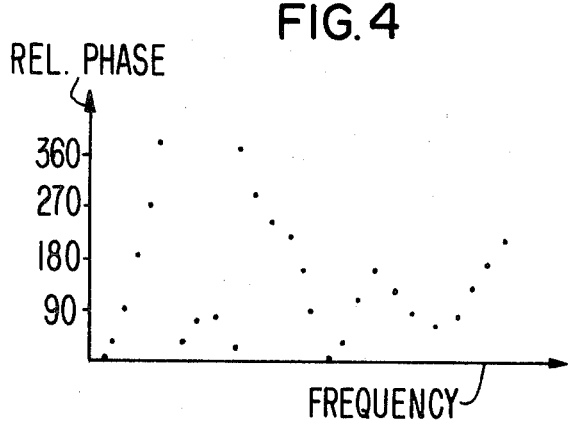
FIG. 4 is a plot of relative phase versus frequency depicting typical phase relations for each of the sidebands depicted in the plot of FIG. 3.

Referring now to FIG. 1 there is shown a gyromagnetic resonance radio frequency spectrometer 1 incorporating features of the present invention. The spectrometer 1 includes a probe structure 2 for positioning a sample of gyromagnetic resonance matter to be investigated within a DC polarizing magnetic field $H_0$. A radio frequency generator 3 produces a radio frequency carrier signal of a frequency $f_0$ near the gyromagnetic resonance frequency of the spectrum of the sample to be analyzed as disposed in the polarizing magnetic field of intensity $H_0$. While the spectrometer 1 may be employed for analyzing proton resonance of various sample materials it is especially useful for analyzing other spin systems having wider spectrums, such as the resonance of fluorine compounds having typical spectral bandwidths centered at approximately 94 megahertz in 23.5 kilogauss magnetic field of approximately 40 kilohertz.

The output of the radio frequency generator 3 is fed to a phase modulator 4 wherein the phase of the radio frequency carrier signal is modulated between a condition of 0° phase and 180° relative phase in accordance with a pseudorandom binary sequence produced by a pseudorandom binary sequence generator 5 which feeds its output to the modulator input of the phase modulator 4. Other relative phase shifts may be employed such as 90°, 45°, etc. A clock pulse generator 6 feeds its output to the pseudorandom binary sequence generator 5 for controlling the timing for the sequence generator 5. The clock pulse generator 6 and pseudorandom binary sequence generator 5 are more fully described below with regard to FIG. 6. Briefly, the pulse generator 6 and pseudorandom binary sequence generator 5 are of the type disclosed in IBM Technical Disclosure Bulletin, Vol. 8, No. 9, dated Feb., 1966. In addition, these elements are also described in the aforecited copending U.S. Application 568,041.

The output of the phase modulator 4 is a radio frequency signal of the type depicted in FIG. 2 wherein the RF power remains substantially constant over the length of the pseudorandom binary sequence. However, during the period of the binary sequence the phase of the radio frequency signal is modulated between 0° and 180° relative phase in accordance with the pseudorandom binary sequence. The points of phase shift are indicated by the vertical lines 7 in FIG. 2. The clock pulse generator 6 determines the basic step length $\tau$ for the binary sequence. The basic step length $\tau$ is illustrated in FIG. 2 as the minimum time between successive phase shifts, such time being illustrated as $t_1$ minus $t_0$. The total time for each pseudorandom sequence is $t_N$, where N is the total number of basic step lengths in the pseudorandom sequence. In a typical example, the pseudorandom sequence is one second long and contains 65,535 step lengths. At the end of the pseudorandom binary sequence the sequence repeats itself.

The phase modulation of the radio frequency carrier signal causes the power of the radio frequency signal to be relatively uniformly distributed over a relatively wide bandwidth of uniform spectral density as indicated in the spectral diagram of FIG. 3. More particularly, the modulated carrier signal will have an envelope, as a function of frequency which is a (sin $x/x)^2$ function, with $x=\pi(f-f_0)\tau$. The first mode has a bandwidth BW of $2/\tau$, where $\tau$ is the basic step length. The spectral lines of the transmitted signal will have a frequency separation $\Delta F$ equal to $1/N\tau$, where N is the total number steps in the pseudorandom sequence and $\tau$ is the basic step length. Thus, for the case illustrated, the frequency separation of the Fourier components is 1 Hertz and the bandwidth is 131,070 Hertz. Thus, if only half of the total available bandwidth is to be employed by positioning $f_0$ to one end of the spectrum of the sample to be excited, the available bandwidth is 65,535 Hertz which adequately covers the spectrum width of 40 kilohertz required to monitor the spectrum of Fluorine compounds.

Figure 5:
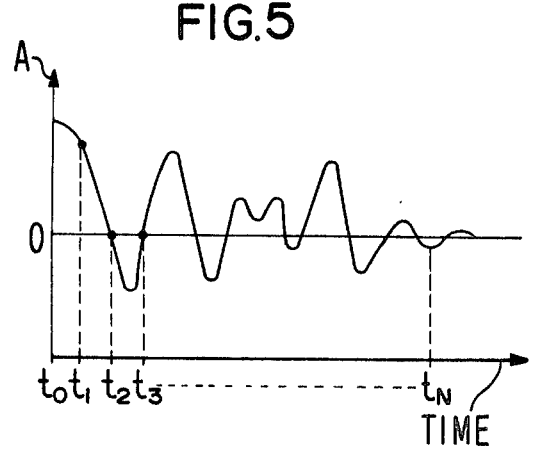
FIG. 5 is a plot of the amplitude of the composite resonance signal emanating from the sample under analysis versus time showing the successive time displaced points at which the composite resonant signal is sampled.

The phase modulated transmitter signal is applied to the probe for simultaneously exciting the various spectral lines of the sample under analysis to produce a composite resonance signal having an envelope as indicated in FIG. 5, the composite resonance signal, emanating from the sample under analysis, is received in a radio frequency amplifier 8 and amplified and fed to one input of a radio frequency phase detector 9 where it is phase detected against a reference signal derived from the radio frequency transmitter at the carrier frequency $f_0$. A phase shifter 11 is provided for adjusting the phase of the reference signal if desired.

The output of the radio frequency phase detector 9 is a composite resonance signal of the type shown in FIG. 5 transformed to the audio frequency range. The output of the radio frequency phase detector 9 is amplified by an audio frequency amplifier 12 and fed to the input of an analog-to-digital converter 13 which performs a time scan on the composite resonance signal. The time scan is synchronized with each cycle of the pseudorandom binary sequence via a scan trigger signal derived from the sequence generator 5. The composite resonance signal is sampled at periodic intervals corresponding to the basic step length $\tau$ of the binary sequence generator 5. Thus, if there are N basic steps in the pseudorandom sequence there are N sampling times for each cycle of the pseudorandom sequence generator. These sampling times are indicated by the solid dots on the envelope of the composite resonance signal of FIG. 5. The analog-to-digital converter 13 converts the sampled amplitude of the composite resonance signal into digital data to be sequentially stored in respective channels of a memory of a computer, such as an Varian Data Machines 620 $i$ computer 14. The computer 14 includes an address portion for addressing the sampled digital data to the respective storage channel. The address is synchronized with the basic bit rate of the pseudorandom sequence generator via a channel selector output derived from the sequence generator 5 and fed to the address. Thus, there is one scan of the composite resonance signal for each cycle of the pseudorandom sequence generator, such scan including a multitude of sampling points, the digital data derived from each sampling point is stored in a respective channel of the storage. The digital data derived from consecutive cycles of the pseudorandom sequence is added in the respective channels of the storage for time averaging the noise to obtain signal enhancement since the coherent signal adds in accordance with the number of sampled bits, whereas the noise adds only as the square root of the number of sampled bits, thereby obtaining substantial improvement in signal-to-noise ratio. After a relatively large number of cycles of the pseudorandom binary sequence generator, as of 500, the computer reads out the data stored in each of the respective channels and performs a Fourier transform function for converting the composite resonance signal into its separate Fourier components. The scan synchronization and the channel selector synchronization, as obtained from the pseudorandom binary sequence preserves the phase information for the separate Fourier components of the resonance signal. Each of these resonance components has a certain predetermined phase relation relative to the exciting Fourier component of the transmitter signal. This predetermined phase relation is generally indicated in FIG. 4 and can be precisely determined by a Fourier transformation of the particular pseudorandom binary sequence. The relative phases for the various Fourier components of the transmitter signal are indicated by the solid dots of FIG. 4. A Fourier transform program 15 which takes into account the precise nature of the pseudorandom sequence is fed to the computer 14 for preserving the relative phase shifts of the various Fourier components read out of the computer 14. The Fourier components of the resonant signal, as derived from the computer 14, are fed to a plotter 16 to obtain a plot of the resonance spectrum of the sample under analysis. The pure absorption or pure dispersion mode of the resonance signals may be obtained by suitable changes in the Fourier transform program or by selecting the correct phase shift for variable phase shifter 11.

Figure 6:
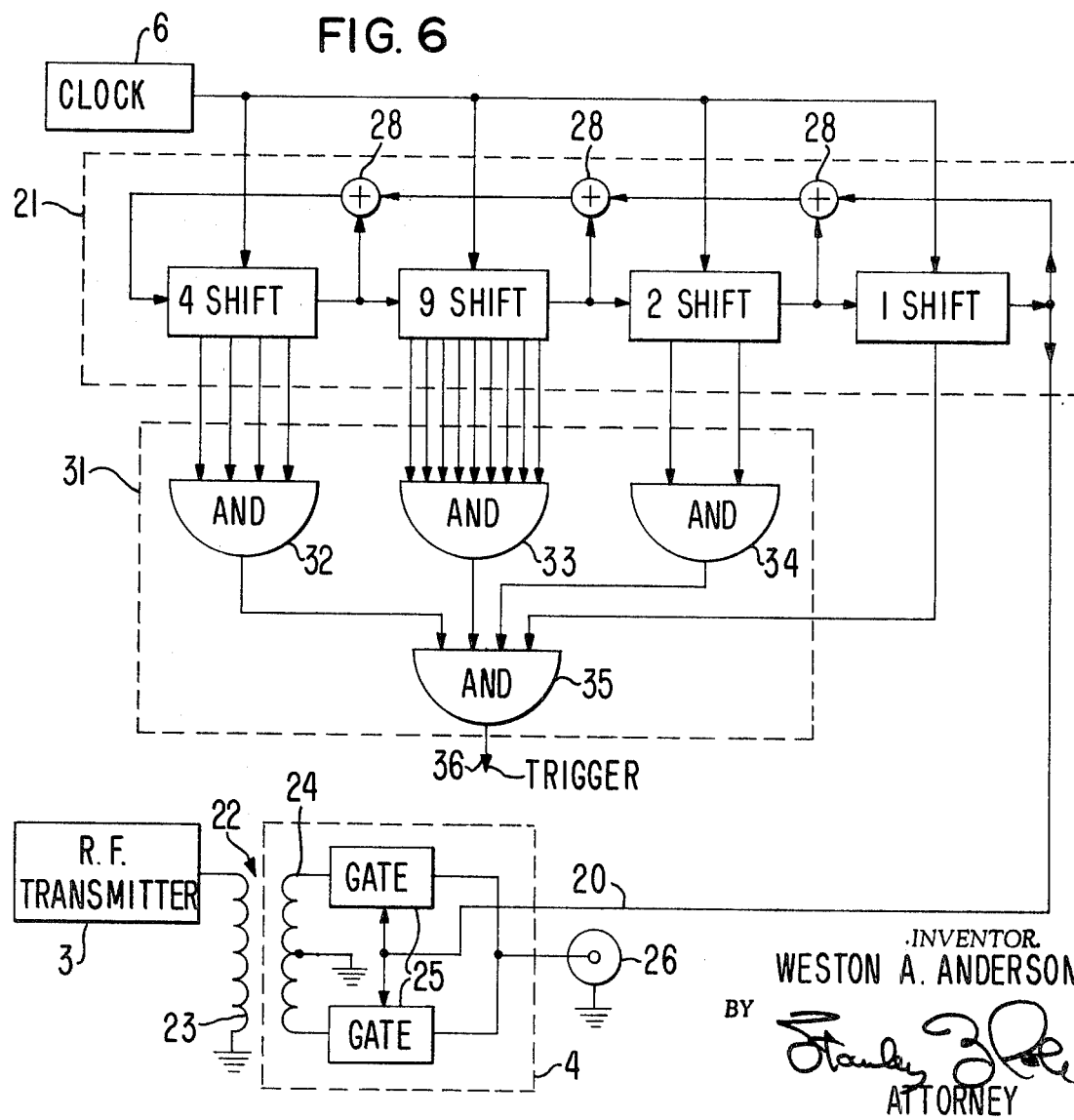
FIG. 6 is a schematic block diagram of a pseudorandom binary sequence generator connected for modulating the phase of the radio frequency generator is accordance with the pseudorandom binary sequence and also depicting the circuitry for synchronizing the sampling and storage of the composite resonance signal components with the pseudorandom binary sequence.

Referring now to FIG. 6, there is shown a preferred pseudorandom binary sequence generator 5. In this embodiment, a shift register 21, which is connected to produce a maximum length sequence, more fully described below, is driven by a train of coherent pulses derived from the clock pulse generator 6. The output of the shift register 21 at 20 is a binary random sequence containing a certain number of basic steps before the sequence repeats. The number of basic steps, N, in the sequence is $2^n$ minus 1 where $n$ is the number of binaries in the shift register 21. The binary random sequence is applied to the phase modulator 4. The phase modulator 4 modulates the phase of the RF carrier signal, as derived from the RF transmitter 3, between 0° and 180° relative phase, in accordance with the pseudorandom binary input signal. The phase modulator 4 includes an input transformer 22, the primary winding 23 of which is driven from the RF transmitter 3. The opposite ends of the secondary winding 24 of the transformer 22 have signals with opposite phase (shifted by 180°). A pair of gates 25 are connected between the opposite ends of the secondary winding 24 and an output at terminal 26. The gates 25 are connected such that when a positive input signal is applied in between the gates 25 a first one of the gates 25 is opened and the second one is closed and, conversely, when a negative or zero input signal is applied, the second gate 25 is opened and the first gate 25 is closed. Thus, the phase of the output signal at terminal 26 varies by 180° in accordance with the input pseudorandom binary signal derived from the output of the shift register 21.

The shift register 21 is of the type described in a book entitled, "Error-Correcting Codes," by William Peterson, published by M.I.T. Press and John Wylie and Sons in 1961, at p. 121. Shift register 21 includes a certain number of binaries such as flip-flops, having the output of each one serving as one of the inputs to the next. The binaries are grouped in four groups of 4, 9, 2 and 1, respectively. Each binary is parallel connected to the clock pulse generator 6, as indicated. The output of the final binary of each group of the series is connected back to the input of the first binary through the intermediary of Modulo-2-Adders 28 which have a second input derived from the return from the succeeding groups of binaries. The Modulo-2-Adders 28 are provided at each of the node points in the feedback path.

The shift register 21 is preferably connected for a maximum length sequence in order to simplify construction of the shift register for a given length sequence, i.e., number of bits before the sequence repeats. The number of binaries $n$ required for a maximum length sequence of N basic steps is given by the relationship $N=2^n-1$. Assuming a minimum of 40,000 basic steps were required in the pseudorandom sequence, then $n$ equals 16 is the nearest integer number that will fulfill this condition. The connection of these 16 binaries is then found by reference to the table at p. 254 of the aforementioned book by making entry at degree 16 (see page 261) where the degree corresponds to the number of binaries. For example, the first listing in the table for polynomial of degree 16 is 210013F and corresponds to the actual representation of a primitive polynomial of degree 16. The binary equivalent of 210013 is 10,001,000,000,001,011 and the corresponding polynomial is $X^{16}+X^{12}+X^3+X+1$ and the corresponding shift register is shown in FIG. 6.

A trigger generator 31 generates a trigger output pulse on lead 36 when all of the binaries are in the same state, for example, when each has a positive output signal. This occurs only once per cycle of the pseudorandom sequence. The trigger circuit 31 is a logical "and" circuit including AND gates 32, 33, 34 and 35 arranged so that a positive output signal is generated at 36 only when all of the input signals from the individual binaries are positive, otherwise a zero or negative voltage appears at the output 36.

The output 36 of the trigger generator 31 is fed to the A to D converter 13 and to the computer 14 to synchronize the start of the time scan of the composite resonance signal by the converter 13 and to synchronize the start of the memory location selection sequence of the computer 14 via the address of the computer 14, with the same point in each cycle of the binary sequence so that phase relationships are preserved between the various Fourier components of the composite resonance signal. Alternatively, the converter 13 sampling times and address locations advance signals may be derived from the clock pulse generator 6 instead of from the internal clock of the computer 14, and fed to the analog-to-digital converter 13 and to the address of the computer 14, such that the sampling times are synchronized with the base frequency fed to the sequence generator 5. In this case the pulses may be counted in the computer 14 so that synchronization of the binary sequency cycle with the start of the time scan and start of the memory selection is maintained.

Also, it is not necessary that the composite resonance signal be sampled during the time that the transmitter signal is applied to the sample under analysis. The various resonance lines of the sample under analysis which are excited into resonance will continue to ring or give off coherent signals for a certain period after the termination of one cycle of the pseudorandom sequence. Therefore, the sampling of the composite resonance signal by the analog-to-digital converter 13 may be delayed until termination of each cycle of the pseudorandom sequence. Such sampling occurring in a period between successive binary sequences produced by the pseudorandom binary sequence generator 5.

Figure 7:
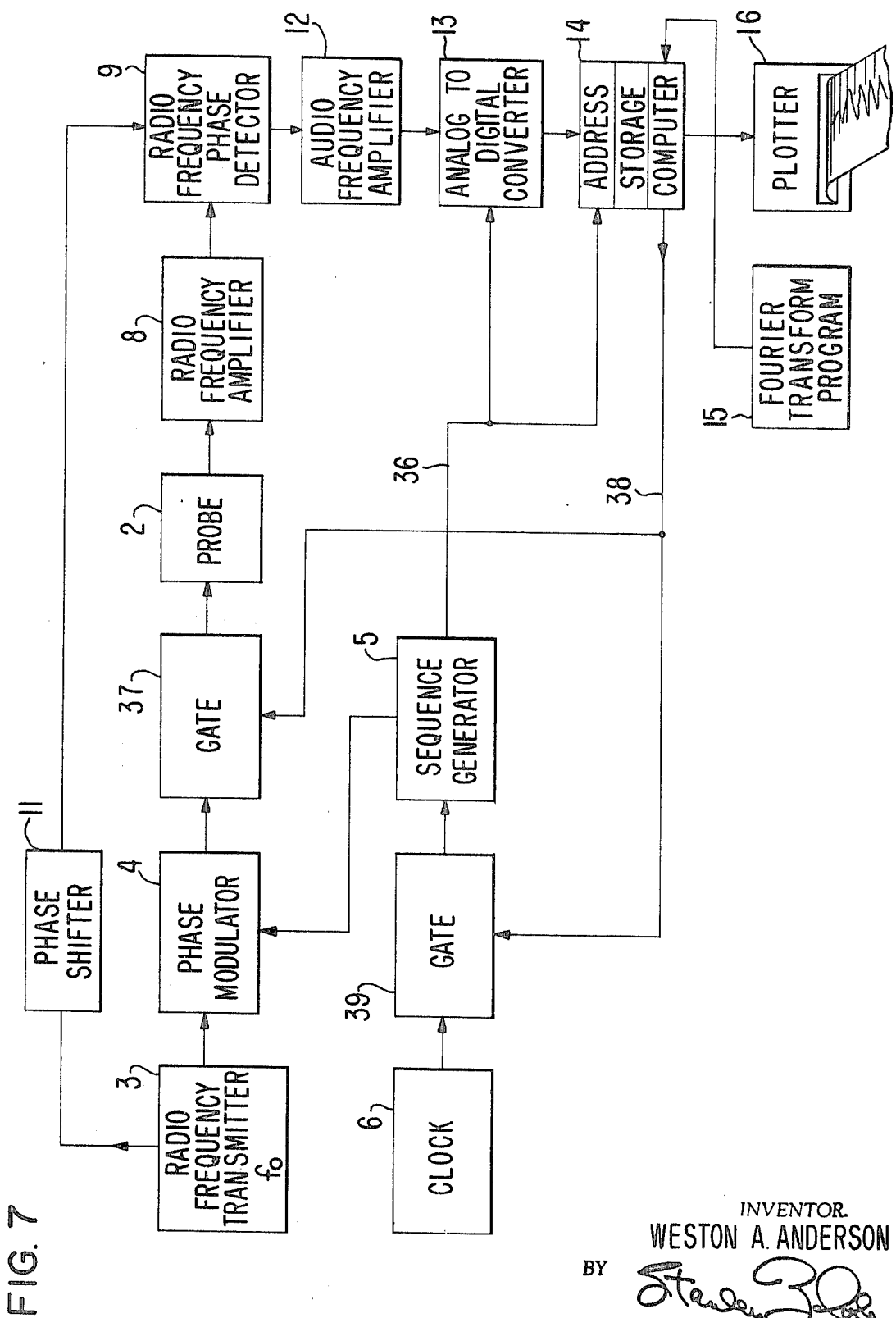
FIG. 7 is a schematic block diagram of an alternative embodiment of a radio frequency spectrometer incorporating features of the present invention.

Referring now to FIG. 7 there is shown a spectrometer 40 operable in this latter mode. The spectrometer 40 is essentially the same as that of FIG. 1 except that immediately upon termination of each of the pseudorandom binary sequences a scan trigger signal is fed from trigger 36 to the analog-to-digital converter 13 and to the channel memory selector to start the scan of the composite resonance signal emanating from the sample.

A gate 37 is placed between the transmitter 3 and probe 2 in order to observe the composite resonance signal emanating from the sample in the absence of the transmitter power. This gate 37 is controlled from the computer 14 via output 38 which in turn is synchronized by the trigger signal 36 from the generator 5. The same gate control signal 38 is also fed to a second gate 39 placed between the clock 6 and the sequence generator 5 so that the transmitter power is applied to the probe 3 at the same point in each of the succeeding pseudorandom sequences.

Although a preferred embodiment employs phase modulation of the transmitter signal $f_0$, this is not a requirement and alternatively, the radio frequency transmitter signal may be intensity modulated with the pseudorandom binary sequence.

As used herein the term "radio frequency spectrometer" is defined to mean not only radio frequencies but microwave frequencies as well and includes nuclear resonance spectrometers, electron spin spectrometers and nuclear quadrupole resonance spectrometers.

Since many changes could be made in the above construction and many apparently widely different embodiments of this invention could be made without departing from the scope thereof, it is intended that all matter contained in the

What I claim is:

1. In a radio frequency spectrometer, means for generating a band of radio frequency energy to be applied to a sample of matter to be analyzed, such energy having a sufficient bandwidth to cover the spectral lines of the sample to be analyzed for simultaneously exciting radio frequency resonance of different resonance spectral lines within the sample, means for detecting the excited resonance of the sample to obtain a composite resonance signal therefrom for analysis of the sample, means for repetitively time scanning and storing a multiplicity of successive time displaced components of the composite resonant signal in a multiplicity of respective channels, means for reading out the signal components stored in such channels, the improvement wherein, said means for generating the band of radio frequency energy to be applied to the sample includes; means for generating a radio frequency carrier signal, means for generating a pseudorandom sequence of outputs, means for modulating the carrier signal with the pseudorandom output sequence; and means for synchronizing the storage of the successive time displaced resonance components in the respective channels with the pseudorandom output sequence for maintaining phase of the resonance components stored in a given channel on successive time scans of the composite resonance signal.

2. The apparatus of claim 1 wherein the pseudorandom sequence is a sequence of binary data outputs.

3. The apparatus of claim 2 wherein said means for modulating the carrier signal with the pseudorandom binary sequence includes a phase modulator for modulating the phase of the carrier signal by 180° relative phase in accordance with the binary pseudorandom sequence.

4. The apparatus of claim 2 wherein said means for generating a pseudorandom binary sequence includes a shift register having an array of binary elements, means forming an electrical feedback circuit loop containing at least one Modulo-2-Adder interconnecting the ends of said binary array, said shift register being connected for a maximum length sequence.

5. The apparatus of claim 1 wherein the radio frequency spectrometer is a nuclear magnetic resonance spectrometer.

6. The apparatus of claim 1 wherein the radio frequency spectrometer is a nuclear quadrupole resonance spectrometer.

7. The apparatus of claim 1 wherein the radio frequency spectrometer is an electron spin resonance spectrometer.

8. The apparatus of claim 1 wherein the radio frequency spectrometer is a microwave spectrometer.

9. The apparatus of claim 2 wherein said means for storing time displaced components of the composite resonance signal in respective channels includes, means forming an analog-to-digital converter for sequentially sampling the amplitude of each composite resonance signal at certain time displaced intervals, and for converting the sampled amplitude components into a sequence of binary digital resonance output data, means for addressing the sequence of binary digital resonance data outputs to different respective channels for storage therein, and wherein said synchronizing means synchronizes the sampling of the resonance signal by said analog-to-digital converter with the binary data sequence applied to said carrier frequency modulator.

10. The apparatus of claim 9 wherein said analog-to-digital converter includes means for repetitively time scanning the composite resonance signal and wherein said synchronizing means synchronizes the start of each time scan of the composite resonance signal with the start of each pseudorandom binary data sequence as applied to said modulator means.

11. The apparatus of claim 10 wherein said channel readout means includes means for sequentially reading out the cumulative digital data in each channel as derived from a multiplicity of time scans of the resonance signal, and means for Fourier transforming the successive readouts from different channels to derive a sequence of outputs representative of a time average of the different spectral lines of the resonant signal.